(12) United States Patent
Frank

(10) Patent No.: US 12,554,945 B2
(45) Date of Patent: Feb. 17, 2026

(54) ELECTROMAGNETIC COUPLER ARRANGEMENT

(71) Applicant: SATO CORPORATION, Tokyo (JP)

(72) Inventor: Markus Frank, Stravalla (SE)

(73) Assignee: SATO Corporation, Tokyo (JP)

(*) Notice: Subject to any disclaimer, the term of this patent is extended or adjusted under 35 U.S.C. 154(b) by 0 days.

(21) Appl. No.: 18/851,957

(22) PCT Filed: Mar. 28, 2022

(86) PCT No.: PCT/EP2022/058072
§ 371 (c)(1),
(2) Date: Sep. 27, 2024

(87) PCT Pub. No.: WO2023/186257
PCT Pub. Date: Oct. 5, 2023

(65) Prior Publication Data
US 2025/0217607 A1    Jul. 3, 2025

(51) Int. Cl.
*G06K 1/12* (2006.01)
*H03H 7/42* (2006.01)

(52) U.S. Cl.
CPC ............. *G06K 1/12* (2013.01); *H03H 7/42* (2013.01)

(58) Field of Classification Search
CPC .................................. G06K 1/12; H03H 7/42
(Continued)

(56) References Cited

U.S. PATENT DOCUMENTS 11,900,200 B2 *   2/2024  Forster ................. H01Q 1/36
2008/0297428 A1 * 12/2008  Wu ..................... H01Q 13/0266
                                                          343/786
(Continued)

FOREIGN PATENT DOCUMENTS

EP      3 238 141 A1    11/2017
EP      3 381 130 A1    10/2018
(Continued)

OTHER PUBLICATIONS

International Search Report dated Oct. 26, 2022, issued in counterpart International Application No. PCT/EP2022/058072. (3 pages).
(Continued)

*Primary Examiner* — Ahshik Kim
(74) *Attorney, Agent, or Firm* — WHDA, LLP

(57) ABSTRACT

The present disclosure broadly relates to a dual frequency reactive near field electromagnetic coupler arrangement for an RFID inlay, in particular encoding the RFID inlay by means of an electromagnetic signal. A core element of the arrangement is a double-ended linear metallic structure of a spiral or elongated spiral planar shape and comprising a plurality of loop-shaped metallic trace segments. The structure is connected to a feeding terminal and individual segments are interconnected by means of inductive and capacitive elements forming an LC filter network that is arranged so as to enable efficient operation of the coupler structure in two different frequency ranges, in particular HF and UHF. The present disclosure further relates to an RFID printer/encoder incorporating the dual frequency reactive near field electromagnetic coupler arrangement.

13 Claims, 3 Drawing Sheets

(58) Field of Classification Search
USPC .......................................................... 235/492
See application file for complete search history.

(56) References Cited

U.S. PATENT DOCUMENTS

| | | | |
|---|---|---|---|
| 2011/0285511 A1* | 11/2011 | Maguire | H01Q 1/2225 |
| | | | 340/10.1 |
| 2013/0113676 A1* | 5/2013 | Liu | H01Q 5/378 |
| | | | 343/850 |
| 2014/0247190 A1* | 9/2014 | Loftus | H01Q 1/50 |
| | | | 343/793 |
| 2016/0180213 A1 | 6/2016 | Forster | |
| 2018/0254803 A1 | 9/2018 | Frank et al. | |

FOREIGN PATENT DOCUMENTS

| | | |
|---|---|---|
| JP | H08-162838 A | 6/1996 |
| JP | 2018-538707 A | 12/2018 |
| WO | 2016/106112 A1 | 6/2016 |
| WO | 2017/088933 A1 | 6/2017 |
| WO | 2021/180319 A1 | 9/2021 |

OTHER PUBLICATIONS

Frank et al., "Design Equations for Lumped Element Balun With Inherent Complex Impedance Transformation", IEEE Transactions on Microwave Theory and Techniques, vol. 65, No. 12, Dec. 2017, pp. 5162-5170, cited in Specification. (9 pages) Date of Publication Nov. 14, 2017.
Office Action dated Oct. 7, 2025, issued in counterpart JP Application No. 2024-557457, with English translation. (6 pages).

* cited by examiner

ELECTROMAGNETIC COUPLER ARRANGEMENT

FIELD

The present disclosure broadly relates to electromagnetic coupling technology. More specifically, a non-limiting embodiment relates to an electromagnetic coupler arrangement suitable for use in a printer for coding RFID inlays or other near field encoding applications that is operable in at least two different frequency ranges.

BACKGROUND

Radio frequency identification (RFID) is a technology that uses radio waves to transfer data from electronic tags (known as RFID tags or RFID inlays). The information is stored electronically in the tag. For reading out the information, an RFID reader transmits an encoded radio signal to interrogate the tag. The RFID tag therefore includes a planar metallic trace, more specifically, a current loop, suitable for inductive coupling. The same planar metallic trace (current loop) can also be used for encoding the RFID tag by means of electromagnetic coupling.

An RFID device that includes a planar metallic trace is, usually, referred to as an inlay. Technically spoken, an RFID inlay is an RF terminated planar metallic trace. In particular, an inlay is an RFID device including a planar metallic trace film supported on a flexible substrate, which is connected to a transponder. The transponder, included in the current loop, is an integrated circuit for deciphering signals sent to the inlay and received by the planar metallic trace. The transponder is also employed for sending a signal to the planar metallic trace, which is then transmitted by the planar metallic trace (sometimes also called "antenna"). The inlay antenna may be tuned (i.e. sized) to communicate at a certain target frequency with a transceiver, which includes at least a coupling element for communication with the RFID inlay and an interrogator. For a better understanding, it is noted that, within the present disclosure, the term "antenna" is interpreted as meaning a radiating device. The present disclosure, however, relates to coupling in the reactive near field, as opposed to the radiation far field. The usage of the term "antenna" is therefore restricted to RFID inlays and tags, since their intended operation and design target may be in the propagating near and/or far field.

In recent years, printing devices have become known that enable dislocating an RFID inlay on a medium, such as a sheet of paper, and at the same time, enable encoding the RFID inlay with the desired information during the printing process. The encoding is performed by means of electromagnetic coupling, preferably in the reactive near field. For this purpose, an RFID printer/encoder is provided with an electromagnetic coupler arrangement that fits in a cavity of the printer so as to couple electromagnetic power bearing the coding information into the RFID inlay, which is located on the medium, while the medium is guided through the printer/encoder along a media path.

Coupler arrangements with only a single coupling element may be used, as well as those with a plurality of coupling elements forming a one or two dimensional array may be used.

In practical implementations, there exist RFID labels (tags) with different operation frequencies. For instance, an operation frequency for encoding interrogated RFID tags may be in the HF (high frequency) or in the UHF (ultrahigh frequency) frequency range. In the present disclosure, "HF" is used to designate any frequency range between approximately 3 and 30 MHz (Megahertz). A typical center frequency of HF communication is 13.56 MHz. "UHF" is used to designate a range of much higher frequencies. Typical UHF frequencies are in any range between approximately 300 MHz and 3 GHz (Gigahertz).

There even exist RFID labels including several tags, which may include either or both of HF and UHF tags. There may either be a single physical chip operating at both HF and UHF frequencies or there may be two independent and spatially distributed tags (chips) in an inlay operating at HF and/or UHF frequencies, respectively. In the former type, there may be an HF antenna as well as a UHF "antenna" on a single chip. In particular, there is a single RFID chip having separate connections to a respective HF and UHF antenna. In an example, the HF antenna is a near field multi turn magnetic coil and the UHF antenna is tuned for propagating far field.

However, in certain applications, such as printer applications, it is not desirable to use radiative (far field) coupling in view of the limited space requirements. Therefore, it is desirable to implement a loop type reactive near field coupler solution for UHF inlays as well. It is noted that even though tag/inlay antennas have nominal radiative characteristics, these same structures may also be utilized for reactive near field coupling applications, in particular when loop-type structures are included.

For example, in printer applications (but without being limited to these) it may therefore be desirable to communicate by means of a single coupling arrangement with labels (tags) using different frequency ranges, in particular tags of HF and UHF technology. In particular, a printer should be enabled to encode (program) both HF and UHF RFID labels (tags), within a single hardware (and, preferably, also software) platform.

Another challenge that exists in a printer environment, in particular for small-sized printers such as label and tag printers, is the limited available space within which a respective electromagnetic coupler arrangement can be mounted. Although it might, in principle, be possible to foresee a plurality of independent coupler arrangements for different frequency ranges, connected to respective interrogators in a single printer, this has the drawback of desiring enlarged space requirements as compared to single frequency encoding coupler arrangements.

It is therefore desirable to provide a universal electromagnetic coupler arrangement suitable for encoding RFID inlays that is operable in different frequency ranges and is further suitable for being mounted in devices with limited mounting space, such as label and tag printers.

SUMMARY

The present invention aims to address the problems mentioned above and to provide a dual frequency electromagnetic coupler arrangement using a common hardware arrangement for both communication in a first frequency range and a second frequency range.

This is achieved by the features of claim 1. Further features and advantages of embodiments of the present invention are the subject matter of dependent claims.

According to a first aspect, a dual frequency reactive near field electromagnetic coupler arrangement for mutual coupling with an RFID inlay by means of electromagnetic energy, is provided. The electromagnetic coupler arrangement comprises a ground plane and a double-ended linear metallic structure having a spiral or elongated spiral planar shape and comprising a plurality of loop-shaped metallic trace segments. Each segment is connected to a next segment by means of an inductive element. A first terminal of a first loop-shaped metallic trace segment and an end terminal of the last loop-shaped metallic trace segment are connected via inductive elements to a first and a second feeding terminal, respectively. The inductive elements are arranged so that each inductive element is adjacent to its preceding inductive element and its subsequent inductive element, along the current path of the linear metallic structure. Capacitive elements are, respectively, arranged so as to connect between each terminal of an inductive element and the respective terminals of the adjacent inductive elements.

It is the particular approach of a non-limiting embodiment to provide a reactive near field electromagnetic coupler arrangement for encoding RFID inlays that is capable of operating in at least two frequency ranges such as HF and UHF. Specifically, the coupler arrangement comprises a double-ended linear metallic structure, having a plurality of loop-shaped metallic trace segments that are connected to each other and to a feeding terminal in a specific manner by means of inductive and capacitive elements, forming a ladder-like LC-filter network. Thereby, a different manner of operation is achieved, depending on a frequency range of an input signal fed to the coupler arrangement. In a lower frequency range (for example: HF), the signal passes through the individual loop segments in sequential order, forming a spiral or elongated spiral loop as the active loop. In a higher frequency range (for example: UHF), the individual loop segments become shunted so as to form a single loop with a thicker metallic trace. While such a coupler topology is sufficient in the UHF frequency range, it should be taken into account that when using the same physical length for HF as for UHF, the resulting electrical length at HF would be extremely short and also the losses would be very low so that the coupler system would be difficult to match. Therefore, the present invention enhances the physical length and self inductance by a factor corresponding to the number of individual loops in the structure with the ladder-like LC filter network. In particular, the electromagnetic coupler arrangement is suitable for being arranged in a printer having an RFID encoding functionality, such as a small-sized label and tag printer.

The approach as outlined may be realized by a wireless electromagnetic coupler arrangement according to the first aspect described above.

According to a non-limiting embodiment, the electromagnetic coupler arrangement has a multi-layered structure. Therein, the double-ended linear metallic structure is arranged in a top surface layer forming a top surface to be arranged closest to an RFID inlay with which electromagnetic coupling is to be established. A (first) metallic ground plane layer comprising the ground plane is arranged beneath the top surface layer. The capacitive and inductive elements are arranged in a component layer arranged on the opposite side of the (first) ground plane layer as compared to the top surface layer. The ground plane layer is separated from the top surface layer by a substrate layer (first dielectric substrate layer) having vias therein for providing an electric connection between the components and the loop-shaped metallic trace segments. In the same manner, another substrate layer (second substrate layer) with vias therein for electrical connection is arranged between the metallic ground plane layer and the component layer. A reason for this implementation, wherein the components are arranged in another layer, separate from the top surface layer, is that for most efficient near field coupling, the actual metallic coupling structure should be a completely flat (plane) structure so that the inductive and capacitive elements must be provided in a different plane (layer). The component layer may preferably further comprise a feeding network for feeding the first feeding terminal and the second feeding terminal, thus becoming a component and feeding layer. In particular, the feeding network may comprise a balun (balanced-to-unbalanced transformer) that is capable of achieving a differential feeding of the feeding terminals, at least in a certain frequency range.

According to preferred non-limiting embodiments, the multi-layered structure further comprises an intermediate signal layer arranged on a side of the (first) metallic ground plane layer that is opposite to the top surface layer. In this case, there is a further (second) metallic ground plane layer arranged between the intermediate signal layer and the component layer/component and feeding layer. A third and a fourth dielectric substrate layer are arranged between the first metallic ground plane layer and the intermediate signal layer and between the intermediate signal layer and the second metallic ground plane layer, respectively. For electrically interconnecting the component (component and feeding) layer to the top surface layer and/or the intermediate signal layer, vias are provided in the third and fourth dielectric substrate layers. An intermediate signal layer may be necessary to properly distribute signals input from the component and feeding layer to the coupler structure in the top surface layer, when there is a more complicated signal structure such as one including signal crossings in space. A person skilled in the art is aware that a multi-layered structure of this type is known as a microstrip line/stripline structure in the art.

Also preferably, the double-ended linear metallic structure is an elongated spiral planar shape, which is a planar shape, wherein the linear metallic structure is wound around a fixed center point so that each winding comprises straight portions that are arranged parallel to each other. The first terminal of the first loop-shaped metallic trace segment and the end terminal of the last loop-shaped metallic trace segment are located so that there is at least one winding of the linear metallic structure in-between. Further preferably, the first terminal and the end terminal are located adjacent to a straight line extending perpendicularly to a direction in which the linear metallic structure leaves the terminals. Roughly speaking, a connection line between the first terminal and the end terminal of the linear metallic structure is approximately perpendicular to the direction of the metallic trace in the vicinity of the terminals. An advantage of the above described elongated spiral shape as compared to a spiral shape in its strict geometric sense, is achieved due to the presence of the parallel straight portions in each winding. Since in case of differential feeding, i.e. in the higher frequency range, the current flows in the same direction along the entire transmission line loop, as long as the electrical length is less than or equal to half the guided wave length, a homogenous magnetic field is generated along the line so as to be distributed over the whole loop length of the coupler. Thereby, an enhanced flexibility in achieving highly efficient coupling with inlays of various shapes, is reached. At the same time, the confinement of the magnetic field to the area of the coupler surface only, is maintained, so that selectivity is not affected.

In accordance with preferred non-limiting embodiments, the electromagnetic coupler arrangement further comprises a balun as a feeding network. The balun has a first balun terminal to be connected to the first feeding terminal and a second balun terminal to be connected to the second feeding terminal. The balun is configured so as to feed the linear metallic structure with electromagnetic signals equal in amplitude and shifted by 180° in phase when operating in a first frequency range (higher frequency range) and to feed the signal to the first feeding terminal only while the second feeding terminal is grounded, when operating in a second frequency range (lower frequency range than the first frequency range). Further preferably, the balun has a third balun terminal functioning as a coupler input to be connected to an interrogator device for feeding electromagnetic energy to be coupled to the RFID inlay. A first current path between the third balun terminal and the first balun terminal includes at least one inductive element. The first current path is connected to ground via at least one capacitive element. A second current path between the third balun terminal and the second balun terminal includes at least one capacitive element and is connected to ground via at least one inductive element. With a balun arrangement as described above, the balun itself implements an LC-filter structure enabling different operations depending on a feeding frequency. In particular, as mentioned above, in a high frequency range (such as UHF) the balun is a double-ended structure enabling differential feeding. In a lower frequency range (such as HF) the balun is operating as a single-ended structure, with a terminal grounded. A specific implementation of the balun in form of an LC filter network, will be described in more detail below.

According to a preferred non-limiting embodiment, the electromagnetic coupler arrangement further comprises an interrogator device for providing signals (interrogation signals or coding signals to be coupled to the RFID inlay) and/or processing response signals received from the RFID inlay through the electromagnetic coupler arrangement. The interrogator device is coupled to the third balun terminal for feeding electromagnetic energy to be coupled to the RFID inlay.

According to an alternative preferred non-limiting embodiment, an interrogator device may be provided separately from the actual structure of the electromagnetic coupler arrangement.

According to preferred non-limiting embodiments, the first (higher) frequency range is an UHF frequency range and the second (lower) frequency range is an HF frequency range. Further preferably, an electrical length of one loop-shaped metallic trace segment does not exceed one half of the guided wavelength in the first frequency range. Otherwise, at UHF a zero crossing of the current along the loop would occur, which may lead to degradation in coupling towards the inlay.

According to preferred non-limiting embodiments, the electromagnetic coupler arrangement is adapted to encode the RFID inlay by coupling electromagnetic power thereto.

Also preferably, the coupler arrangement is suitable for being employed in a printer, wherein RFID inlays to be encoded are arranged on a medium guided in the printer along a media path.

According to a non-limiting further particular aspect, an RFID printer/encoder comprising an electromagnetic coupler arrangement according to the first aspect or any of non-limiting embodiments thereof, is provided. Since the electromagnetic coupling for transferring coding information to an RFID inlay occurs in the reactive near field, the multi-layer electromagnetic coupler arrangement can be easily fitted into a printer cavity, in proximity to the media path.

According to preferred non-limiting embodiments, the RFID printer/encoder further comprises an interrogator device for feeding electromagnetic energy to be coupled to the RFID inlay. Further preferably, the interrogator device includes an HF interrogator and a UHF interrogator that are integrated as a single unit and embedded on a motherboard.

The non-limiting embodiments disclosed broadly aim to provide an improved electromagnetic coupler arrangement that is applicable to couple electromagnetic power into inlays of arbitrary shape efficiently in at least two frequency ranges.

These and other aspects and features of non-limiting embodiments will now become apparent to those skilled in the art upon review of the following description of specific non-limiting embodiments in conjunction with the accompanying drawings.

BRIEF DESCRIPTION OF THE DRAWINGS

Additional features and advantages of non-limiting embodiments will become apparent from the following description as illustrated in the accompanying drawings, wherein.

DETAILED DESCRIPTION

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The present disclosure relates to an electromagnetic coupler arrangement operating in at least two different frequency ranges (such as HF and UHF) for mutual coupling with RFID inlays, in particular, for encoding RFID inlays.

In non-limiting embodiments of the electromagnetic coupler arrangement, an interrogator (sometimes also called "RFID reader") is connected via a balun to a coupling element of a spiral or elongated spiral shape.

The non-limiting embodiments disclosed are particularly suitable for encoding inlays which are provided on a medium such as in an RFID printer/encoder.

The present invention thus provides an RFID enabled printer having a capability to program both HF and UHF RFID labels (tags) within a single software and hardware platform. Hence, a combined HF and UHF RFID functionality is included in a single printer product. In extension, one and the same RFID label may consist of several tags, either of HF technology, UHF technology or the combination thereof.

Figure 1:
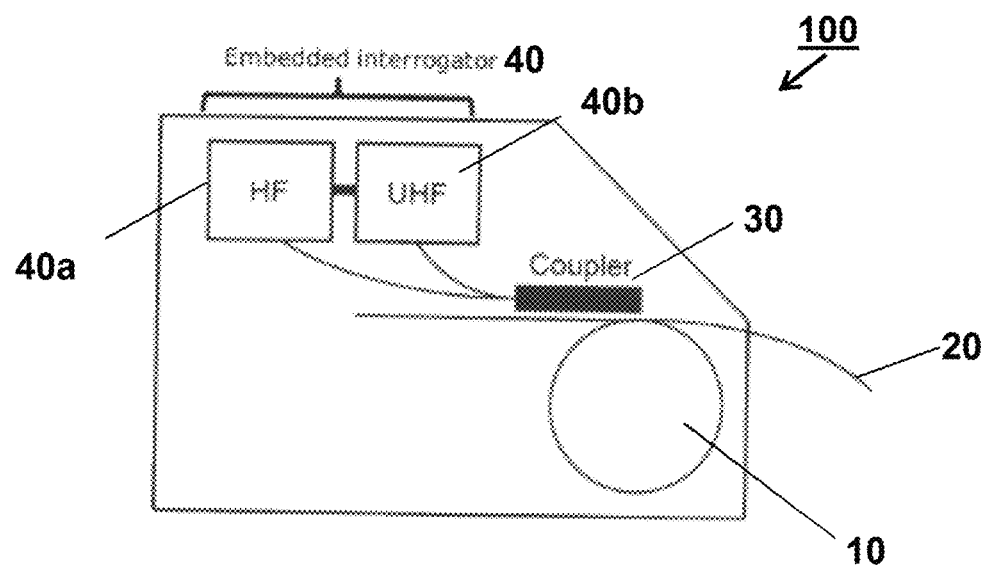
FIG. 1 is a schematic illustration of a printer having an RFID encoding functionality, according to embodiments of the present disclosure.

FIG. 1 provides a general conceptional drawing of a dual frequency printer/encoder according to embodiments of the present disclosure.

The drawing shows, schematically, a printer (RFID printer/encoder) 100 having a platen roller 10 as an element for feeding a print medium 20. The printer further comprises an electromagnetic coupler 30 for encoding an RFID inlay provided (embedded) on the print medium 20. The coupler 30 is coupled (via respective cabling) with an interrogator 40 embedded in the printer. The embedded interrogator 40 includes, in particular, an HF interrogator portion 40a for providing a signal in an HF frequency range to the coupler 30 and a UHF interrogator portion 40b for providing a signal in a UHF frequency range to the coupler 30.

A person skilled in the art is aware of the plurality of further components included in a printer/encoder of this type, which have not been illustrated here in order to reduce complexity of the drawing and to concentrate on those elements of the printer 100 that are related to the essential features of the present disclosure. In particular, any components related to the actual printing have been omitted as have the components for providing control functionality. These components may be implemented in any one of implementations known in the art, wherein the particular way of implementation is unrelated to and, thus, not essential for the present invention.

Although an HF interrogator component and a UHF interrogator component have been shown in the present drawing as two separate components of an embedded interrogator, the present disclosure is not limited to such an implementation. Depending on a degree of integration, in implementing the teaching of the present disclosure, it is possible to employ separate interrogators for HF and for UHF, or separate interrogator components for HF and UHF, respectively, may be used in an interrogator. More specifically, two separate interrogator components (interrogator units) can be embedded on the motherboard of the printer. A still higher degree of integration can be achieved when having a single interrogator capable of generating and processing both HF and UHF signals embedded on the motherboard. As will be explained below, in case of an integrated HF and UHF interrogator, an implementation using only a single feeding line for both frequency ranges is particularly advantageous. This may be achieved, for instance, by means of a feeding network including a balun that may separate the two frequency ranges.

In other words, the interrogator 40 may, dependent upon space availability, be separated into two physical units (40a and 40b) with HF and UHF technology, respectively. Furthermore, the units may be confined in different housings. It is, nevertheless, still common to use the term "embedded" for such a configuration since the interrogator housings are located inside the printer housing.

Another possibility is the integration of HF and UHF technology in a single unit and housing. Since this will reduce the size, it enables application also for smaller size printers. Yet another possibility is an "on-chip" integration, directly onto the motherboard of the printer. In this case, again, HF and UHF technology may be integrated to a greater or lesser degree, either in a multi-frequency chip solution, or in separate frequency dependent chips.

The RFID media to be programmed may be of different types for a combined HF/UHF interrogator solution. Different solutions in frequency and/or spatial sense may be possible. For a single RFID inlay/tag different possibilities exist, either with one physical chip operating at both HF and UHF frequencies, or as two independent and spatially distributed inlays/tags operating at the HF and/or UHF frequencies, respectively.

By providing a universal type of a coupler, operating at two frequency bands (ranges), the present invention achieves the technical advantage of providing a spatially compact coupler solution, which can be easily confined within a single label/inlay pitch length. When referring to the pitch length, it is kept in mind that, in an RFID printer/encoder, the individual RFID labels (tags) are provided (embedded) on a print medium such as a paper roll having a plurality of labels thereon, wherein each of the labels has an RFID tag. The "pitch length" then corresponds to a distance between individual adjacent RFID tags on the print medium. Since it is desired to encode the individual RFID tags separately (already for the reason that, as a rule, different (individual) information has to be coded on the individual tags), a targeted (selective) coupling with only a single RFID tag at one time must be achieved. For this purpose, it is desired that the coupler arrangement is confined to a single label, in particular within a pitch length.

Figure 2:
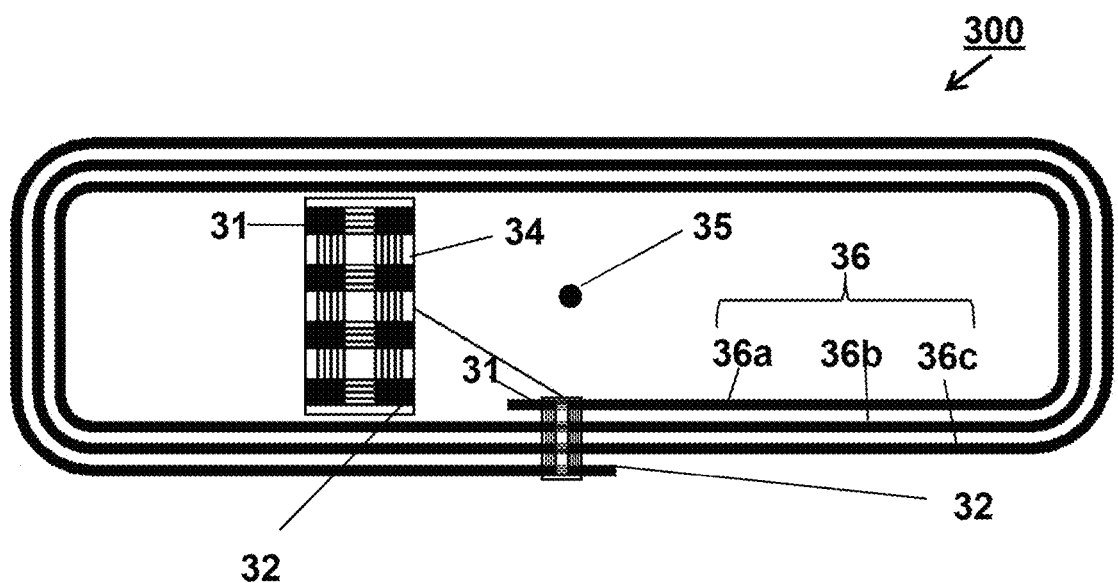
FIG. 2 is an illustration of the geometric shape of an electromagnetic coupler arrangement with a double-ended linear metallic structure of an elongated spiral shape, according to embodiments of the present disclosure.

FIG. 2 schematically illustrates the structure of an electromagnetic coupler arrangement 300 according to embodiments of the present disclosure.

Specifically, the structure shown in the drawing is a copper trace on a protective circuit board (PCB, also known as printed circuit board), shaped as an elongated spiral path.

Electromagnetic coupler arrangement 300 comprises a double-ended linear metallic structure 36 comprising a plurality of loop-shaped metallic trace segments. In the present example, three loop-shaped metallic trace segments 36a, 36b, and 36c are illustrated. The number of loop-shaped metallic trace segments is, however, by no means limited to three; any other number of loop-shaped metallic trace segments (windings) is possible as well. Preferably, the metallic structure is made of copper, without being limited to this particular metal.

As can be further seen from the drawing, there are provided two feeding terminals 31 and 32, in close proximity to each other. In the area of the feeding terminals, there is further foreseen a ladder structure 34, an enlarged view of which is provided in the middle of the left-hand side of the drawing. Each loop of the metallic trace leaving the ladder structure 34 on the right-hand sides thereof and returning after one winding to the ladder structure 34 on the left-hand side thereof represents a loop-shaped metallic trace segment.

In this ladder structure, the horizontally hatched elements in the middle (corresponding to the "steps" of the ladder) each represent an inductive element. Hence, generally, each of the inductive elements connects a terminal of one loop-shaped metallic trace segment (e.g. on the left-hand side) with a terminal of a next (i.e. subsequent along the current path) loop-shaped metallic trace segment (e.g. on the right-hand side). Thus, in the illustrated example, a terminal of trace segment 36a (left in the second row of the ladder) is connected to a terminal of trace segment 36b (right in the second row of the ladder) and the other terminal of trace segment 36b (left in the third row of the ladder) is connected to a terminal of trace segment 36c (right in the third row of the ladder). There is only an exception at the beginning and the end of the linear metallic structure. Namely, a first terminal of the first trace segment 36a (right in the first row of the ladder) is connected via an inductive element to the first feeding terminal 31 (left in the first row of the ladder). On the other hand, an end terminal of the last trace segment 36c (left in the fourth row of the ladder) is connected via an inductive element to the second feeding terminal 32 (right in the fourth row of the ladder). It is noted that, due to the whole structure being completely symmetric, it is not significant for the present disclosure, which of the illustrated feeding terminals (31 and 32) is labeled "first" and which "second" and, accordingly, which of the trace segments is called "first" and which "last". A convention used in the present detailed description is to call the innermost trace (36a) segment of the elongated spiral shape "first" and the outermost one (36c) "last", but a skilled person is aware that these designations may be changed to another convention within the framework of the present invention.

In the ladder structure 34, the vertically hatched elements (on both sides of the structure and arranged between the "steps" of the ladder, i.e. in the area of the "rods" of the ladder) represent capacitive elements. Hence, there is generally a capacitive coupling between respective terminals ("first" and "second" along the current path) of each trace segment and the respective adjacent trace segment. More specifically, the "first" terminal of second trace segment 36b is capacitively coupled with the "first" terminals of both the first and third ("last") trace segment 36a and 36c (on the right-hand side of the ladder structure). The same holds for the respective "second" terminals (on the left-hand side of the ladder structure).

There is only an exception at the beginning and the end of the overall structure. Namely, there is a coupling via a capacitor between the first feeding terminal 31 and the second terminal of the first trace segments 36a (upper left corner of the ladder structure 34) and between the second feeding terminal 32 and the first terminal of the third ("last") trace segment 36c (lower right corner of the ladder structure 34).

As can be further seen from the drawing, in the given example, the coupler arrangement has an elongated spiral shape, contrary to a spiral shape in its strict geometrical sense, which differs from the illustrated shape by not having any straight portions. The "elongated spiral shape" as understood in the present disclosure illustrated in the drawing, winds in several windings (each of which corresponds to one of the metallic trace segments) around a central point (35 in the drawing). However, there are extended straight (or substantially straight) portions (in particular: in the width direction of the drawing). As can be seen from the drawing, straight portions in each winding are arranged parallel to each other (connected by curved portions) and the feeding terminals are located such that there is at least one winding of the metallic structure in between. As will be detailed below, it is the straight or substantially straight portions, which particularly contribute to an enhanced coupling efficiency.

To give some impression only, without implying any limitation, a size of the structure shown in FIG. 2 in the width dimension may be in the order of 10 mm (millimetres).

Figure 3:
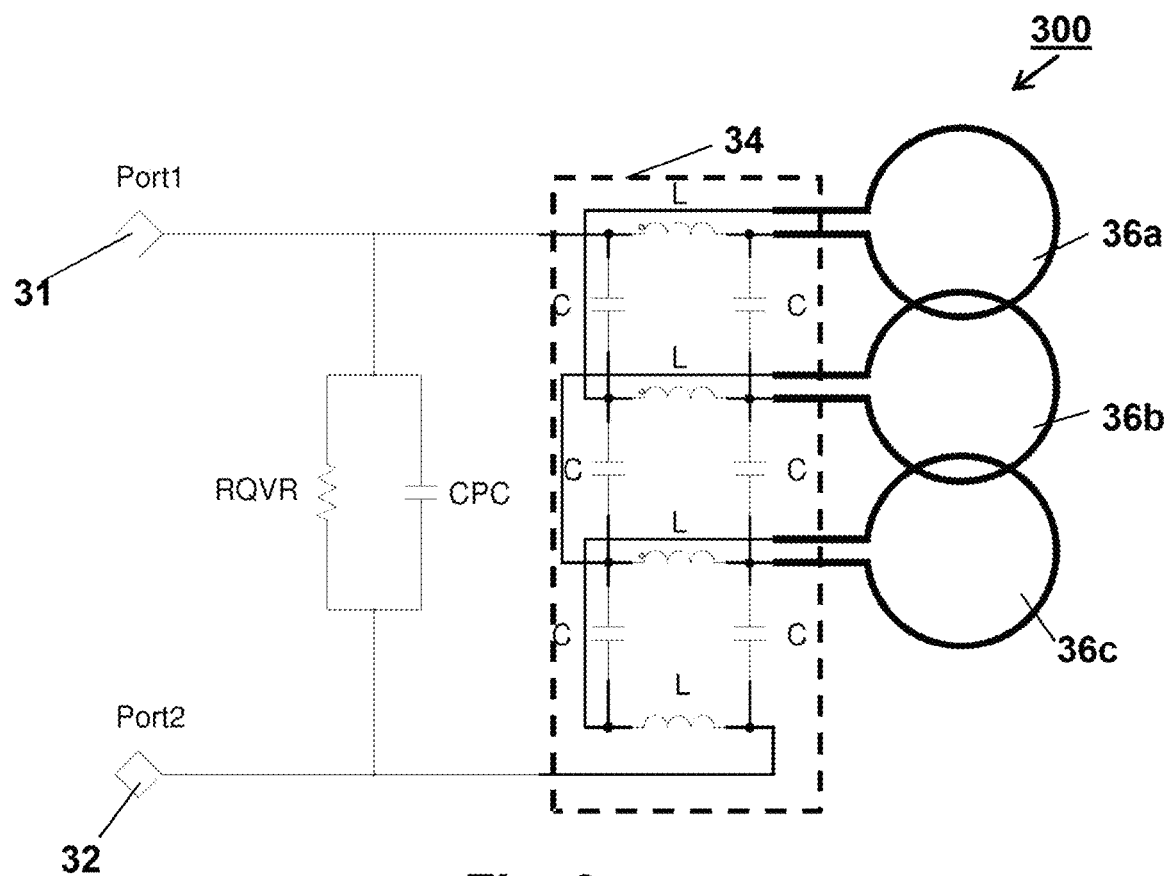
FIG. 3 is a schematic electric circuit diagram of an implementation example of an electromagnetic coupler arrangement as shown in FIG. 2.

FIG. 3 represents an equivalent circuit diagram of the structure illustrated in FIG. 2.

In the following, the functionality of the electromagnetic coupler arrangement 300 illustrated in FIG. 2 will be explained with reference to FIG. 3.

In the drawing, on the right-hand side, metallic trace segments 36a, 36b, and 36c are illustrated as electric current loops. The left hand side shows feeding terminals 31 and 32 (labeled as "Port1" and "Port2", respectively). In the central part of the drawing, the interconnections via capacitive elements (C) and inductive elements (L) arranged in the ladder structure 34 (schematically marked with a dashed box) are shown.

As can be seen therefrom, the interconnections within the ladder structure 34 form an LC-filter network. The filter network creates a separation between low and high frequencies. Namely, for lower frequencies (for example: HF) the inductors represent a low Ohmic path of the signal and the capacitors are high Ohmic. For higher frequencies (for example: UHF), the situation is vice versa. Following the lower frequency path such as at HF, it is seen that the signal passes through the loops in sequential order and, hence, the active loop is a spiral loop. Following the higher frequency path such as at UHF, the loops become shunted, forming a single loop with a thicker metallic trace (for example: copper trace).

As indicated above, there is a requirement, which may become critical for maintaining high coupling efficiency for the loop not to extend beyond half of the guided wavelength at UHF. In this case, a zero crossing of the current along the loop occurs, which implies a degradation in coupling towards the inlay. At HF, the electrical length becomes considerably shorter and, hence, in this case, the number of turns in the spiral loop is not critical. In both cases, the current strength along the loop is of importance, to enable strong reactive near field coupling towards the inlay.

Of course, the electric parameters (values) of the inductive and capacitive elements to be used in a particular implementation, have to be selected and tuned in accordance with the frequency values to be separated, i.e. the frequency ranges within which operation of the coupler is desired. For example, a value of 100 nH at the UHF frequency 890 MHz represents a reactance of 560Ω, considered as high Ohmic. However, at the HF frequency 13.56 MHz, the corresponding value is 8.5Ω, considered as low Ohmic. The values of a capacitor with the value 20 pF are 8.9Ω and 590Ω, considered as low and high Ohmic, respectively. However, the given values are merely examples and the present invention is by no means limited to these.

In FIG. 3, capacitor CPC (Capacitive Phase Compensation) and resistor RQVR (Resistor for Q-Value Reduction) are optional components. The reason for including them is as follows. The LC-network with specifically tuned components may have a very high "Q (quality) factor" which, on the other hand results in a very narrow bandwidth, thus affecting matching. With the help of the additional resistor RQVR the Q factor can be reduced so as to allow a better matching by means of having a broader bandwidth. The value of the capacitor CPC can be set to match the system impedance to a certain input. In other words, CPC may compensate for an overall inductive character of the spiral, resulting in a total real impedance. This real impedance (resistance) may then further be shunted towards a lower value by means of RQVR for an acceptable bandwidth/efficiency compromise.

Figure 4:
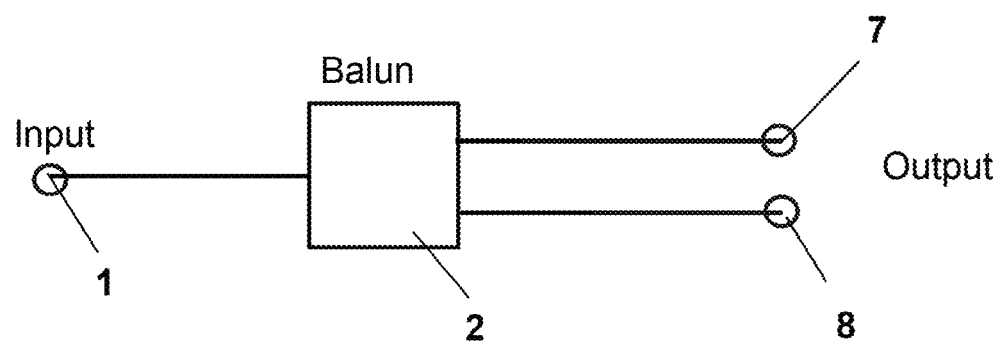
FIG. 4 is a general scheme of a feeding network including a balun suitable for feeding an electromagnetic coupler arrangement in accordance with embodiments of the present disclosure.

FIG. 4 provides a schematic illustration of a circuit including a balun that is suitable for being used as a feeding network in the framework of the present disclosure. Generally speaking, a balun is a functional block transforming a balanced channel (which may carry a differential signal) to an unbalanced or single ended channel.

As can be seen therefrom, the balun 2 has an input terminal 1 and two output terminals 7 and 8.

An input signal in a predetermined frequency band such as from a default 50Ω (Ohm) coaxial cable system is input at input terminal 1. Balun 2 splits the input signal into two signals, output at output terminals 7 and 8. Output terminals 7 and 8 are to be connected to first and second feeding terminals 31 and 32 of the electromagnetic coupler arrangement, respectively, for feeding the split signal. Specifically, balun 2 operates so as to split the input signal into two signals that are of the same amplitude and a phase shift of 180° with respect to each other, at least for input signals in a certain (higher) frequency range such as UHF. Such a combination of signals when output at output terminals 7 and 8 is regarded as a "differential signal".

The differential feeding, i.e. feeding with a differential signal at feeding terminals 31 and 32 further represents a reason as to why the elongated spiral shape of the coupler arrangement may be preferable to a strict geometric spiral shape. Namely, as a consequence of the differential feeding at the terminals 31 and 32, at each instance of time, the current direction in the elongated parallel portions of the metallic structure 36 is the same. This corresponds to a more evenly distributed current density and thus generated magnetic field along the transmission line loop path of the coupler. This enables highly efficient coupling with RFID tags of various shapes. On the other hand, the field strength decreases rather quickly outside the area of the metallic structure so that the magnetic field remains confined to the area of the coupler surface only, and high spatial selectivity is not affected.

For the sake of completeness, it is noted that the simple spiral shape (in its strict mathematical sense, i.e. without flattened elongated portions) would be suitable as a coupler geometry according to the present disclosure. However, the particular advantage of an even current distribution over the top surface so as to achieve an enhanced flexibility regarding various RFID tag shapes would not be achieved thereby.

Figure 5:
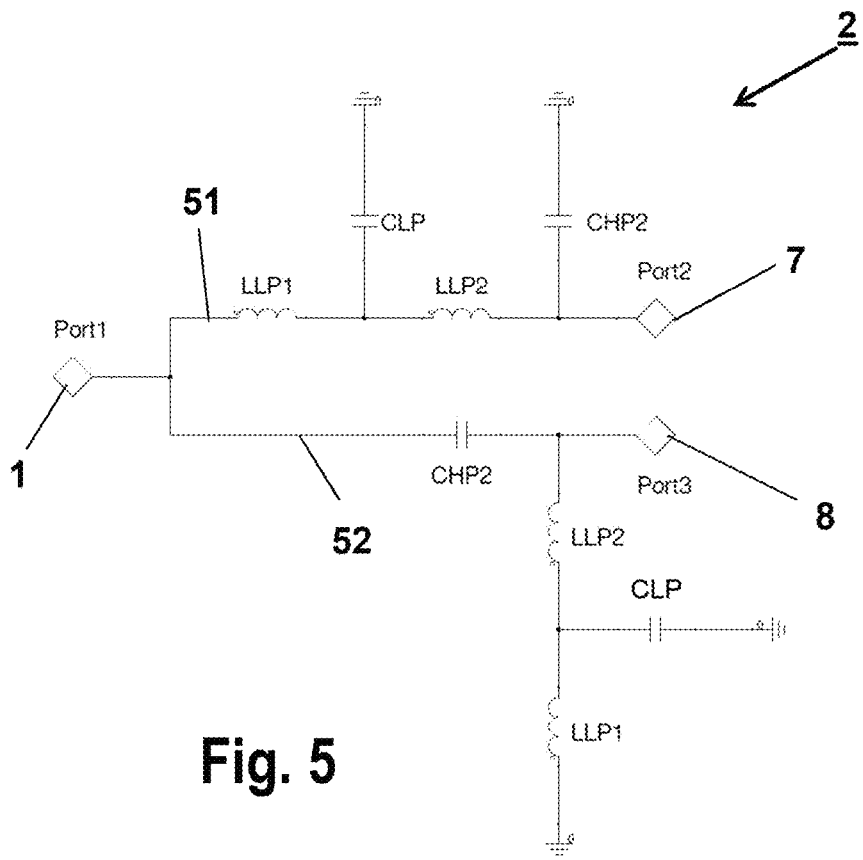
FIG. 5 is a schematic electric circuit diagram of an implementation example of a balun suitable as a feeding network in accordance with embodiments of the present disclosure.

A more detailed explanation of an exemplary implementation of a balun 2 will now be provided with reference to FIG. 5.

FIG. 5 illustrates an equivalent circuit diagram of a particular implementation of a balun 2 that is suitable as a feeding network of the loop structure described above with reference to FIGS. 2 and 3 and as generally shown in FIG. 4.

Such a structure is generally used as a balun transformer for differential feeding of a coupling loop at UHF.

As can be seen from the drawing, balun 2 generally has a three-port structure, with an input terminal 1, labeled "Port1" and two output terminals 7 and 8, labeled "Port2" and "Port3", respectively. For definiteness of the following description, it will be assumed that output terminal 7 is to be coupled with input terminal 31 of the arrangement 300 of FIG. 3 and output terminal 8 is to be coupled with input terminal 32 of the arrangement 300 of FIG. 3, respectively.

As can be further seen from the drawing, input port 1 is connected with output port 7 via a first current path 51 and with output port 8 via a second current path 52. More specifically, first current path 51 connects input terminal 1 and output terminal 7 via inductive elements (illustrated as LLP1 and LLP2). The current path is further connected to ground via capacitive elements (illustrated as CLP and CHP2). Second current path 52 connects input terminal 1 and output terminal 8 via capacitive elements (illustrated as CHP2). The current path is further connected to ground via an LC filter comprising two inductive elements (illustrated as LLP1 and LLP2, respectively) and capacitive element CLP in a further branch, as illustrated. In the present drawing, "LP" stands for "low pass" and "HP" stands for "high pass". In particular, it can be seen that the elements LLP1, LLP2 and CLP form a structure of a low pass filter, respectively, whereas the label "CHP2" has been used for historical reasons of the development here.

On the basis of the scheme of FIG. 5, a similar network analysis is possible as provided above for the loop structure of FIG. 3.

At lower frequencies (for example: HF) the capacitors are high Ohmic paths and inductors are low Ohmic paths. Therefrom, it is clear that a low Ohmic passage occurs from input terminal 1 to output terminal 7, whereas output terminal 8 has low Ohmic passages to ground. Input terminal 1 ("Port1") here represents the coupler input to be connected to the interrogator 40 and, as indicated above, output terminal 7 ("Port2") is connected to one of the loop terminals (for definiteness of description, it is assumed feeding terminal 31 although in view of the symmetry, this is not essential). Output terminal 8 ("Port3") is connected to the other loop terminal (i.e. for definiteness of description, feeding terminal 32) which, consequently, is grounded. Hence, at lower (HF) frequencies, the balun structure actually represents a single ended solution.

On the other hand, at higher frequencies (for example: UHF), the situation is more complicated. The components of the balun (LLP1, LLP2, CLP, and CHP) have specific values according to design equations for the operation at the desired frequency (in particular: UHF). Thereby, it is achieved that at the higher frequencies (UHF), the balun structure represents a tuned device enabling differential feeding at the feeding terminals 31 and 32 of the loop structure 36 (as explained above, operating as a single loop at these frequencies).

Details about the design of the components, including the respective design equations can be found in the article "Design Equations for Lumped Element Balun With Inherent Complex Impedance Transformation", IEEE Transactions on Microwave Theory and Techniques", vol. 65, no. 12, 12 Dec. 2017, by Markus Frank, Mattias Thorsell, and Peter Enoksson. As shown therein, the balun topology illustrated in FIG. 5 is only an example and balun structures applicable within the framework of the present disclosure are not limited to this one. For instance, a topology including a high pass filter in one of the current paths, as well as more complicated structures would be equally possible, to achieve the goal of having a tuned device for differential feeding at UHF and a single ended structure at HF.

However, implementation details of exemplary baluns are not essential for use in the framework of the present disclosure. It is only essential that the structure and component values are chosen so as to enable a differential feeding topology at a higher frequency range (UHF) and a single-ended-to-ground topology at a lower frequency range (HF).

Consequently, the balun 2 may operate at both HF and UHF since the single ended ground connection does not represent a disadvantage at HF, due to the big difference in electrical lengths between the operation at HF and UHF, respectively.

A more distributed type of coupler is also possible with several elements, each one operating at either a single or multiple frequency bands such as described above. This may even be desired if programming over a wider spatial region is required. A coupler element array may be applicable in this case.

Figure 6:
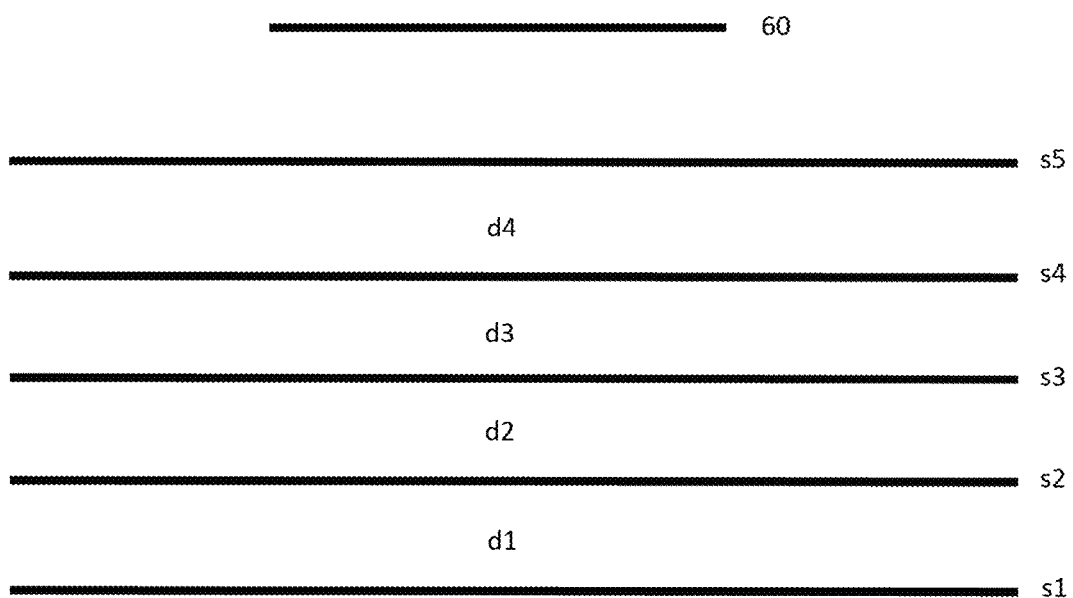
FIG. 6 provides a schematic illustration of an electromagnetic coupler arrangement having a multi-layer structure in accordance with embodiments of the present disclosure.

FIG. 6 illustrates an example of a multi-layer structure implementing an electromagnetic coupler arrangement in accordance with non-limiting embodiments of the present disclosure.

The exemplary multi-layer structure has five metallic signal layers (s1, s2, s3, s4, s5). A plurality of four dielectric substrate layers (d1, d2, d3, d4) is arranged between two neighboring metallic layers each, so as to be "sandwiched" by the neighboring metallic layers. Thereby, the signal layers are electrically isolated. Electric connections can, however, be formed through vias in the substrate layers as desired (not shown in the drawing).

In the illustrated structure, layer s5 corresponds to the top surface layer including the double-ended linear metallic structure 36. FIG. 6 further shows an RFID tag 60 to be encoded, which is arranged in close proximity to the top surface layer s5. In other words, in a printer, the top surface layer s5 is located close to the media path of the printer, along which RFID tags to be encoded, are guided.

Further in the illustrated structure, layers s4, s3, s2 and s1 correspond to the above-described a first ground plane layer, intermediate signal layer (optional), a second ground plane layer (optional) and feeding/component layer, respectively. While an intermediate signal layer is realized in strip line technology, thus always being sandwiched between two ground plane layers, the top surface layer and component and feeding layer are implemented in micro-strip technology, combined with a single ground plane. As indicated, the intermediate signal layer s3 and thus the second ground plane layer s2 are optional, Hence, in a minimal configuration, the layer stack has three metallic layers s5, s4, and s1 (with two substrates d4 and d1 in-between).

An arrangement according to the present disclosure provides a plurality of advantages over conventional technology in the pertinent field.

In accordance with the present disclosure, one single RFID printer product may be used to program both HF and UHF inlays (tags), implying a cost reduction for a customer in need of both HF and UHF printer technology, as compared to the purchase of separate HF and UHF printer products.

Since currently both HF and UHF RFID are viable and concurrent existing technologies, a more streamlined production is possible for a printer manufacturer.

The development towards multifrequency concepts also drives the development of more size compact solutions and integration, which, in turn, enables implementation in a broader range of products.

A more streamlined product in terms of RFID frequency range may also imply a cost reduction in agency approvals.

It is noted that the foregoing has outlined some of the more pertinent non-limiting embodiments. It will be clear to those skilled in the art that modifications to the disclosed non-limiting embodiments can be effected without departing from the spirit and scope thereof. As such, the described non-limiting embodiments ought to be considered as merely illustrative of some of the more prominent features and applications. Other beneficial results can be realized by applying the non-limiting embodiments in a different manner, or modifying them in ways known to those familiar with the art. This includes the mixing and matching of features, elements and/or functions between various non-limiting embodiments being expressly contemplated herein so that a person of ordinary skill in the art would appreciate from this disclosure that features, elements and/or functions of one embodiment may be incorporated into another embodiment, as skilled in the art would appreciate from this disclosure that features, elements and/or functions of one embodiment may be incorporated into another embodiment as appropriate, unless described otherwise, above. Although the description is made for particular arrangements and methods, the intent and concept thereof may be suitable for and applicable to other arrangements and applications.

In summary, the present disclosure relates to a dual frequency reactive near field electromagnetic coupler arrangement for an RFID inlay, in particular encoding the RFID inlay by means of an electromagnetic signal. A core element of the arrangement is a double-ended linear metallic structure of a spiral or elongated spiral planar shape and comprising a plurality of loop-shaped metallic trace segments. The structure is connected to a feeding terminal and individual segments are interconnected by means of inductive and capacitive elements forming an LC filter network that is arranged so as to enable efficient operation of the coupler structure in two different frequency ranges, in particular HF and UHF. The present disclosure further relates to an RFID printer/encoder incorporating the dual frequency reactive near field electromagnetic coupler arrangement.

The invention claimed is:

1. A dual frequency reactive near field electromagnetic coupler arrangement for mutual coupling with an RFID inlay by means of electromagnetic energy, the electromagnetic coupler arrangement comprising:
a ground plane; and
a double-ended linear metallic structure having a spiral or elongated spiral planar shape and comprising a plurality of loop-shaped metallic trace segments, wherein each segment is connected to a next segment by means of an inductive element, wherein
a first terminal of a first loop-shaped metallic trace segment and an end terminal of the last loop-shaped metallic trace segment are connected via inductive elements to a first and a second feeding terminal, respectively,
the inductive elements are arranged so that each inductive element is adjacent to the preceding inductive element and the subsequent inductive element along the current path of the linear metallic structure, and
capacitive elements are, respectively, arranged so as to connect between each terminal of an inductive element and the respective terminals of the adjacent inductive elements.

2. An electromagnetic coupler arrangement according to claim 1 having a multi-layer structure comprising
a top surface layer forming a top surface of the electromagnetic coupler arrangement to be arranged closest to an RFID inlay with which electromagnetic coupling is to be established, wherein the double-ended linear metallic structure is arranged in said top surface layer,
a metallic ground plane layer comprising said ground plane, and
a component and feeding layer, wherein said inductive and capacitive elements are arranged in the component and feeding layer, said component and feeding layer further comprising a feeding network for feeding the first feeding terminal and the second feeding terminal,
a first dielectric substrate layer arranged between the top surface layer and the metallic ground plane layer and a second dielectric substrate layer arranged between said metallic ground plane layer and the component and feeding layer, wherein the inductive and capacitive elements are electrically connected to said double-ended linear metallic structure through vias in said first and said second dielectric substrate layers.

3. An electromagnetic coupler arrangement according to claim 2, further comprising
an intermediate signal layer, said intermediate signal layer being arranged on a side of the metallic ground plane layer that is opposite to said top surface layer, an additional metallic ground plane layer arranged between said intermediate signal layer and said component and feeding layer, and a third and a fourth dielectric substrate layer being arranged between said metallic ground plane layer and said intermediate signal layer and said additional metallic ground plane layer, respectively, said third and said fourth dielectric substrate layers having vias for electrically connecting said component and feeding layer to said top surface layer and/or said intermediate signal layer.

4. An electromagnetic coupler arrangement according to claim 1, wherein said double-ended linear metallic structure has an elongated spiral planar shape, the elongated spiral shape being a planar shape, wherein the linear metallic structure is wound around a fixed center point so that each winding comprises straight portions that are arranged parallel to each other and said first terminal of said first loop-shaped metallic trace segment and said end terminal of said last loop-shaped metallic trace segment are located so that there is at least one winding of the linear metallic structure in-between.

5. An electromagnetic coupler arrangement according to claim 4, wherein said first terminal of said first loop-shaped metallic trace segment and said end terminal of said last loop-shaped metallic trace segment are located adjacent to a straight line extending perpendicularly to a direction in which the linear metallic structure leaves said terminals.

6. An electromagnetic coupler arrangement according to claim 1, further comprising a balanced-to-unbalanced transformer, balun, as a feeding network, said balun having a first balun terminal to be connected to said first feeding terminal and a second balun terminal to be coupled to said second feeding terminal, wherein the balun is configured so as to feed the linear metallic structure with electromagnetic signals equal in amplitude and shifted by 180° in phase when operating in a first frequency range and to feed the signal to the first feeding terminal only while the second feeding terminal is grounded, when operating in a second frequency range, said second frequency range being lower than said first frequency range.

7. An electromagnetic coupler arrangement according to claim 6, wherein said balun further having a third balun terminal arranged so as to function as a coupler input be connected to an interrogator device for feeding electromagnetic energy to be coupled to the RFID inlay, a first current path between said third balun terminal and said first balun terminal includes at least one inductive element, said first current path being connected to ground via at least one capacitive element, and a second current path between said third balun terminal (1) and said second balun terminal includes at least one capacitive element, said second path being connected to ground via at least one inductive element.

8. An electromagnetic coupler arrangement according to claim 6 further comprising an interrogator device to be coupled to said third balun terminal for feeding electromagnetic energy to be coupled to said RFID inlay.

9. An electromagnetic coupler arrangement according to claim 1 that is operable in a first frequency range and a second frequency range, said second frequency range being lower than said first frequency range, said first frequency range being an UHF frequency range and said second frequency range being an HF frequency range.

10. An electromagnetic coupler arrangement according to claim 9, wherein an electrical length of one loop-shaped metallic trace segment does not exceed one half of the guided wavelength in said first frequency range.

11. An electromagnetic coupler arrangement according to claim 1, adapted to encode the RFID inlay by coupling electromagnetic energy thereto.

12. An RFID printer/encoder comprising an electromagnetic coupler arrangement, the electromagnetic coupler arrangement comprising:

a ground plane; and a double-ended linear metallic structure having a spiral or elongated spiral planar shape and comprising a plurality of loop-shaped metallic trace segments, wherein each segment is connected to a next segment by means of an inductive element, wherein a first terminal of a first loop-shaped metallic trace segment and an end terminal of the last loop-shaped metallic trace segment are connected via inductive elements to a first and a second feeding terminal, respectively, the inductive elements are arranged so that each inductive element is adjacent to the preceding inductive element and the subsequent inductive element along the current path of the linear metallic structure, and capacitive elements are, respectively, arranged so as to connect between each terminal of an inductive element and the respective terminals of the adjacent inductive elements.

13. An RFID printer/encoder according to claim 12, further comprising an interrogator device for feeding electromagnetic energy to be coupled to said RFID inlay, said interrogator device including a HF interrogator and a UHF interrogator that are integrated as a single unit and embedded on a motherboard.

* * * * *